(12) United States Patent
Denton

(10) Patent No.: US 6,789,634 B1
(45) Date of Patent: Sep. 14, 2004

(54) SELF-LUBRICATING ELASTOMERIC SEAL WITH POLARIZED GRAPHITE

(75) Inventor: Robert Denton, Pealand, TX (US)

(73) Assignee: Smith International, Inc, Houston, TX (US)

( * ) Notice: Subject to any disclaimer, the term of this patent is extended or adjusted under 35 U.S.C. 154(b) by 0 days.

(21) Appl. No.: 10/446,410

(22) Filed: May 28, 2003

(51) Int. Cl.$^7$ .............................. E21B 10/24; F16J 15/16
(52) U.S. Cl. ........................ 175/371; 175/228; 277/407; 277/910; 277/938
(58) Field of Search ................................. 175/371, 372, 175/228, 229; 277/910, 336, 627, 938, 406, 407

(56) References Cited

U.S. PATENT DOCUMENTS

| | | | | |
|---|---|---|---|---|
| 5,323,863 A | * | 6/1994 | Denton | 175/57 |
| 5,445,748 A | * | 8/1995 | Holinski | 508/129 |
| 5,524,718 A | * | 6/1996 | Kirk et al. | 175/371 |
| 5,612,130 A | * | 3/1997 | Smirnov et al. | 428/323 |
| 5,725,906 A | * | 3/1998 | Allen | 427/231 |
| 6,406,030 B1 | * | 6/2002 | Fang et al. | 277/407 |

FOREIGN PATENT DOCUMENTS

DE             19937160 A1 * 3/2001 ......... G01N/27/407

OTHER PUBLICATIONS

Lubolid Friction Control Additives, Product Information by Dow Corning, 10 pages, Jan. 29, 2001.
Dr. Ruediger Holinski and Dr. Manfred Jungk, New Solid Lubricants as Additive for Greases—"Polarized Graphite"—Dow Corning Corporation, 7 pages, Oct. 23–27, 1999.
Dr. Ruediger Holinski and Dr. Manfred Jungk, New Solid Lubricants as Additive for Greases—"Polarized Graphite"—Dow Corning Corporation, (Version 2) 5 pages, Sep. 2000.

* cited by examiner

Primary Examiner—David Bagnell
Assistant Examiner—T. Shane Bomar
(74) Attorney, Agent, or Firm—Christie, Parker & Hale, LLP

(57) ABSTRACT

O-ring seals for rock bit bearings comprise a body formed from an elastomeric material having a lubricant additive in at least the dynamic seal surface to reduce the coefficient of friction and stick-slip amplitude at O-ring seal surfaces. The lubricant additive comprises polarized graphite. O-ring seals made from elastomeric compositions comprise in the range of from about 50 to 99 percent by volume elastomeric material, and in the range of from about 1 to 50 percent by volume of the polarized graphite based on the total volume of the composition. Preferably, the polarized graphite is in the range of from 7 to 25 percent by volume. As the O-ring seal experiences wear from adjacent metal surfaces, flakes of polarized graphite are released from the O-ring seal and adhere to the adjacent metal surfaces and form a lubricating film.

26 Claims, 2 Drawing Sheets

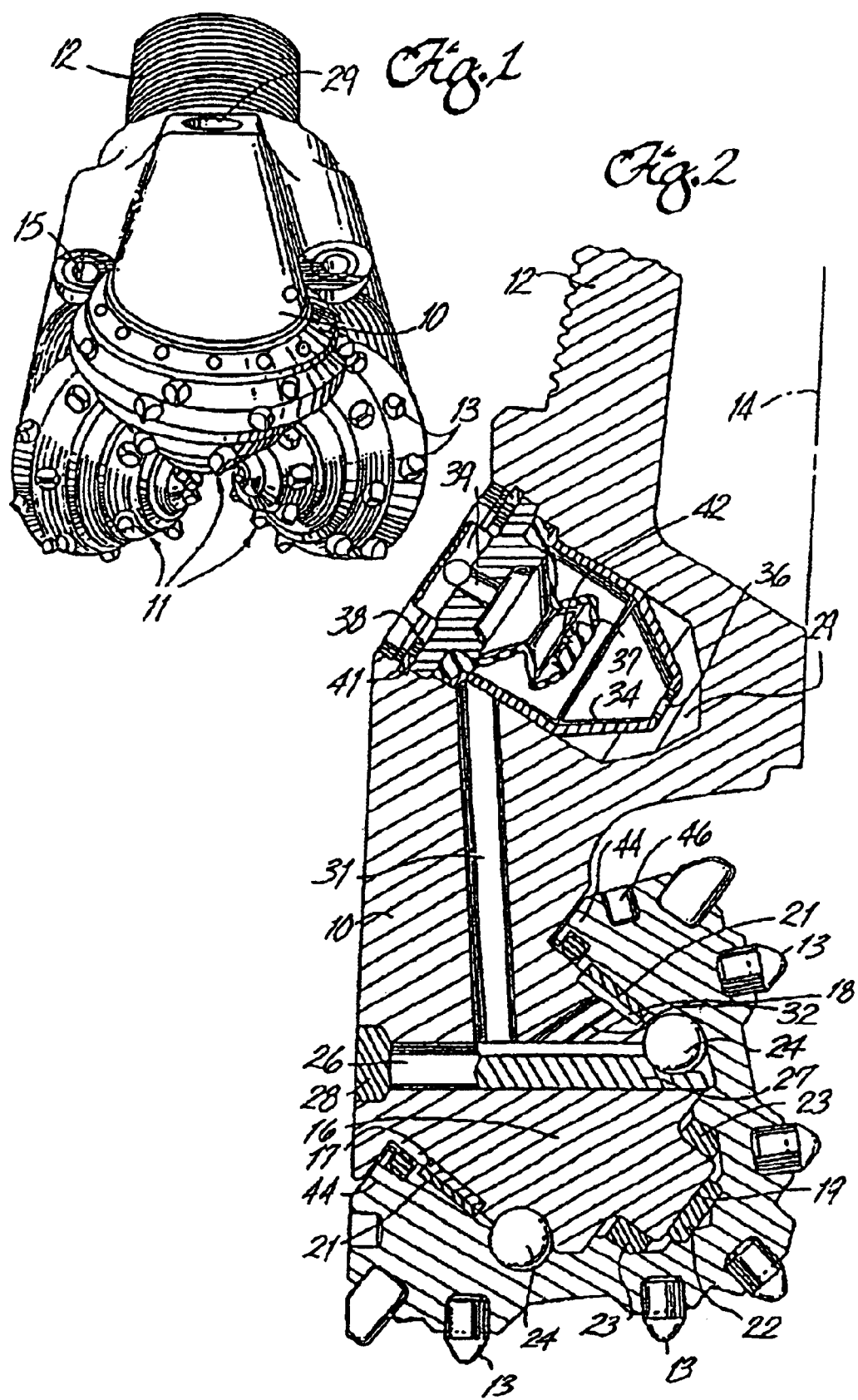

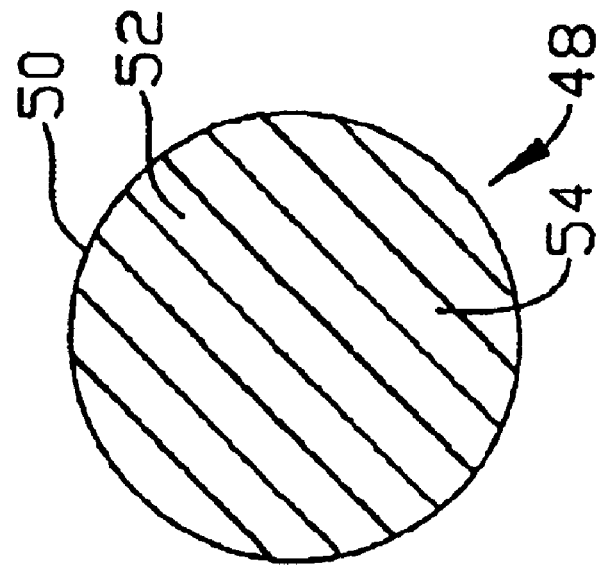
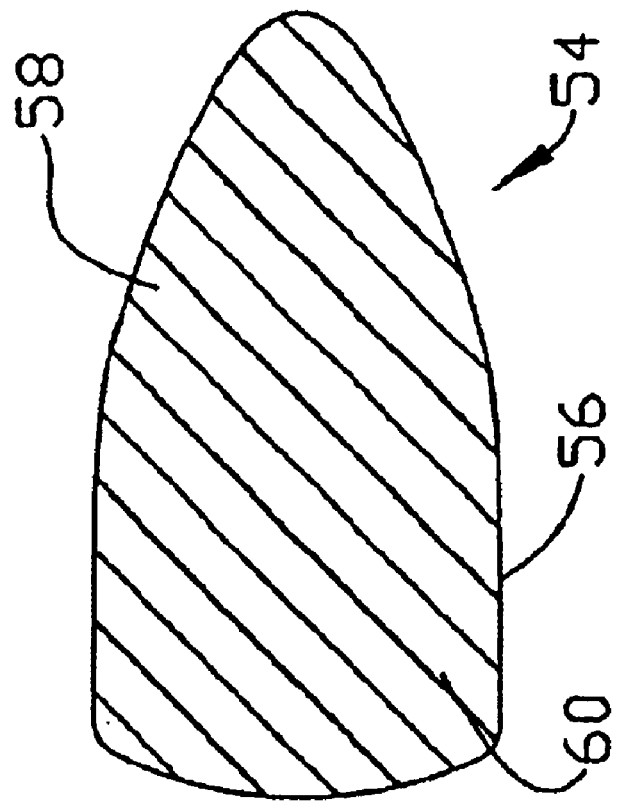

SELF-LUBRICATING ELASTOMERIC SEAL WITH POLARIZED GRAPHITE

FIELD OF THE INVENTION

This invention relates to an O-ring seal for retaining the lubricant around the journal bearings in a rock bit or drill bit for drilling oil wells or the like. More particularly, this invention relates to an O-ring seal comprising a polarized graphite lubricant additive that reduces friction, improves wear resistance, reduces abrasion, and reduces stick-slip between the O-ring seal and interfacing rock bit surfaces to enhance the service life of the O-ring seal and rock bit.

BACKGROUND

Heavy-duty drill bits or rock bits are employed for drilling wells in subterranean formations for oil, gas, geothermal steam, minerals and the like. Such drill bits have a body connected to a drill string and a plurality, typically three, of hollow cutter cones mounted on the body for drilling rock formations. The cutter cones are mounted on steel journals or pins integral with the bit body at its lower end. In use, the drill string and bit body are rotated in the bore hole, and each cone is caused to rotate on its respective journal as the cone contacts the bottom of the bore hole being drilled. As such a rock bit is used for drilling in hard, tough formations, high pressures and temperatures are encountered.

When a drill bit wears out or fails as a bore hole is being drilled, it is necessary to withdraw the drill string for replacing the bit. The amount of time required to make a round trip for replacing a bit is essentially lost from drilling operations. This time can become a significant portion of the total time for completing a well, particularly as the well depths become great. It is therefore quite desirable to maximize the service life of a drill bit in a rock formation. Prolonging the time of drilling minimizes the time lost in "round tripping" the drill string for replacing the bits. Replacement of a drill bit can be required for a number of reasons, including wearing out or breakage of the structure contacting the rock formation.

One of the consistent problems in drill bits is the inconsistency of service life. Sometimes bits are known to last for long periods, whereas bits which are apparently identical operated under similar conditions may fail within a short lifetime. One cause of erratic service life is failure of the bearings. Bearing failure can often be traced to failure of the seal that retains lubricant in the bearing. Lubricant may be lost if the seal fails, or abrasive particles of rock may work their way into the bearing surfaces, causing excessive wear.

Rock bit elastomeric O-rings and the like are being called on to perform service in environments which are extremely harsh. Modern bits are being run at exceptionally high surface speeds, sometimes more than 500 feet per minute, with cone speeds averaging in the range of from 200 to 400 revolutions per minute. One face of the O-ring or the like is exposed to abrasive drilling fluid and mud. The life of the O-ring may be significantly degraded by high temperatures due to friction (as well as elevated temperature in the well bore) and abrasion.

In order to provide a consistently reliable seal for maintaining the lubricant within rock bits, it is known to make the O-ring seal from a resilient elastomeric composition displaying a desire degree of chemical resistance, heat resistance, and wear resistance. O-ring seals known in the art are constructed from resilient elastomeric materials that, while displaying some degree of chemical, heat, and wear resistance, ultimately limit the service life of the rock bit by wearing away along the surface during use.

Attempts have been made to improve O-ring properties of wear resistance by adding lubricant additives to the elastomeric composition. U.S. Pat. No. 5,402,858, for example, discloses an O-ring seal formed from an elastomeric material comprising low-friction wear resistant particles distributed therein. The wear resistant particles were selected from the group including copper, bronze, brass, nickel, cobalt, cemented tungsten carbide, and titanium carbide. It has been discovered that while such exemplary O-ring seal constructions displayed reduced properties of stick-slip, they were not completely effective at reducing friction and abrasion between the interfacing O-ring seal and rock bit surface.

It is therefore desirable to provide a consistently reliable O-ring seal for maintaining the lubricant within a rock bit, that has a long useful life, is resistant to crude gasoline and other chemical compositions found within oil wells, has high heat resistance, is highly resistant to abrasion, has a low coefficient of friction against the adjacent seal surfaces to minimize heating and wear, and that will not readily deform under load and allow leakage of the grease from within the bit or drilling mud and debris into the bit.

BRIEF SUMMARY OF THE INVENTION

There is, therefore, provided in practice of this invention an improved O-ring seal for rock bit bearings comprising a body formed from an elastomeric material and including a lubricant additive. The lubricant additive is formed from polarized graphite.

O-ring seals made from elastomeric compositions of this invention comprise in the range of from about 50 to 99 percent by volume elastomeric material, and in the range of from about 1 to 50 percent by volume of polarized graphite based on the total volume of the composition. Wax may also be included in the composition.

BRIEF DESCRIPTION OF THE DRAWINGS

These and other features and advantages of the present invention will become appreciated as the same becomes better understood with reference to the drawings wherein:

FIG. 1 is a semi-schematic perspective of a rock bit containing an O-ring seal constructed according to principles of this invention;

FIG. 2 is a partial cross-sectional view of the rock bit of FIG. 1;

FIG. 3 is a cross-sectional view of an O-ring seal, constructed according to principles of this invention, having a symmetric axial cross section; and FIG. 4 is a cross-sectional view of an alternative embodiment of an O-ring seal, constructed according to principles of this invention, having an asymmetric axial cross section.

DESCRIPTION

A rock bit employing an O-ring seal constructed according to principles of this invention comprises a body 10 having three cutter cones 11 mounted on its lower end, as shown in FIG. 1. A threaded pin 12 is at the upper end of the body for assembly of the rock bit onto a drill string for drilling oil wells or the like. A plurality of tungsten carbide inserts 13 are pressed into boles in the surfaces of the cutter cones for bearing on the rock formation being drilled. Nozzles 15 in the bit body introduce drilling fluid into the space around the cutter cones for cooling and carrying away formation chips drilled by the bit.

O-ring seals are generally thought of as comprising a cylindrical inside and outside diameter, and a circular cross section. Accordingly, for purposes of reference and clarity, the figures used to describe the principles and embodiments of this invention have been created to illustrate an O-ring seal having a generally circular cross section. However, the principles of this invention are also meant to apply to O-ring seals having non-circular cross sections. Such O-ring seals can be configured having either symmetric or asymmetric non-circular cross sections (e.g., a so-called bullet seal with a bullet-shaped cross section). It is, therefore, to be understood that the principles of this invention may apply to elastomeric seals having a circular or non circular cross sections.

FIG. 2 is a fragmentary, longitudinal cross-section of the rock bit, extending radially from the rotational axis 14 of the rock bit through one of the three legs on which the cutter cones 11 are mounted. Each leg includes a journal pin extending downwardly and radially, inwardly on the rock bit body. The journal pin includes a cylindrical bearing surface having a hard metal insert 17 on a lower portion of the journal pin. The hard metal insert is typically a cobalt or iron-based alloy welded in place in a groove on the journal leg and having a substantially greater hardness that the steel forming the journal pin and rock bit body.

An open groove 18 is provided on the upper portion of the journal pin. Such a groove may, for example, extend around 60 percent or so of the circumference of the journal pin, and the hard metal insert 17 can extend around the remaining 40 percent or so. The journal pin also has a cylindrical nose 19 at its lower end.

Each cutter cone 11 is in the form of a hollow, generally-conical steel body having cemented tungsten carbide inserts 13 pressed into holes on the external surface. For long life, the inserts may be tipped with a polycrystalline diamond layer. Such tungsten carbide inserts provide the drilling action by engaging a subterranean rock formation as the rock bit is rotated. Some types of bits have hard-faced steel teeth milled on the outside of the cone instead of carbide inserts.

The cavity in the cone contains a cylindrical bearing surface including an aluminum bronze insert 21 deposited in a groove in the steel of the cone or as a floating insert in a groove in the cone. The aluminum bronze insert 21 in the cone engages the hard metal insert 17 on the leg and provides the main bearing surface for the cone on the bit body. A nose button 22 is between the end of the cavity in the cone and the nose 19 and carries the principal thrust loads of the cone on the journal pin. A bushing 23 surrounds the nose and provides additional bearing surface between the cone and journal pin. Other types of bits, particularly for higher rotational speed applications, have roller bearings instead of the journal bearings illustrated herein. It is to be understood that O-ring seals constructed according to principles of this invention may be used with rock bits comprising either roller bearings or conventional journal bearings, and either insert bits or milled tooth bits.

A plurality of bearing balls 24 are fitted into complementary ball races in the cone and on the journal pin. These balls are inserted through a ball passage 26, which extends through the journal pin between the bearing races and the exterior of the rock bit. A cone is first fitted on the journal pin, and then the bearing balls 24 are inserted through the ball passage. The balls carry any thrust loads tending to remove the cone from the journal pin and thereby retain the cone on the journal pin. The balls are retained in the races by a ball retainer 27 inserted through the ball passage 26 after the balls are in place. A plug 28 is then welded into the end of the ball passage to keep the ball retainer in place. The bearing surfaces between the journal pin and the cone are lubricated by a grease. Preferably, the interior of the rock bit is evacuated, and grease is introduced through a fill passage (not shown). The grease thus fills the regions adjacent the bearing surfaces plus various passages and a grease reservoir, and air is essentially excluded from the interior of the rock bit. The grease reservoir comprises a cavity 29 in the rock bit body, which is connected to the ball passage 26 by a lubricant passage 31. Grease also fills the portion of the ball passage adjacent the ball retainer, the open groove 18 on the upperside of the journal pin, and a diagonally extending passage 32 therebetween. Grease is retained in the bearing structure by a resilient seal in the form of an O-ring 44 between the cone and journal pin.

A pressure compensation subassembly is included in the grease reservoir 29. The subassembly comprises a metal cup 34 with an opening 36 at its inner end. A flexible rubber bellows 37 extends into the cup from its outer end. The bellows is held into place by a cap 38 with a vent passage 39. The pressure compensation subassembly is held in the grease reservoir by a snap ring 41.

When the rock bit is filled with grease, the bearings, the groove 18 on the journal pin, passages in the journal pin, the lubrication passage 31, and the grease reservoir on the outside of the bellows 37 are filled with grease. If the volume of grease expands due to heating, for example, the bellows 37 is compressed to provide additional volume in the sealed grease system, thereby preventing accumulation of excessive pressures. High pressure in the grease system can damage the O-ring seal 44 and permit drilling fluid or the like to enter the bearings. Such material is abrasive and can quickly damage the bearings. Conversely, if the grease volume should contract, the bellows can expand to prevent low pressures in the sealed grease system, which could cause flow of abrasive and/or corrosive substances past the O-ring seal.

The bellows has a boss 42 at its inner end which can seat against the cap 38 at one end of the displacement of the bellows for sealing the vent passage 39. The end of the bellows can also seat against the cup 34 at the other end of its stroke, thereby sealing the opening 36. If desired, a pressure relief check valve can also be provided in the grease reservoir for relieving over-pressures in the grease system that could damage the O-ring seal. Even with a pressure compensator, it is believed that occasional differential pressures may exist across the O-ring of up to 150 psi (550 kilopascals). To maintain the desired properties of the O-ring seal at the pressure and temperature conditions that prevail in a rock bit, to inhibit "pumping" of the grease through the O-ring seal, and for a long useful life, it is important that the O-ring seal be resistant to crude gasoline and other chemical compositions found within oil wells, have a high heat and abrasion resistance, have low rubbing friction, and not be readily deformed under the pressure and temperature conditions in a well which could allow leakage of the grease from within the bit or drilling mud into the bit.

Suitable elastomeric materials useful for forming O-ring seal constructions of this invention include those selected from the group of carboxylated elastomers such as carboxylated nitriles, highly saturated nitrile (HSN) elastomers, nitrile-butadiene rubber (NBR), highly saturated nitrile-butadiene rubber (HNBR) and the like. Particularly preferred elastomeric materials are HNBR and HSN. An exemplary HNBR material is set forth in the examples below.

Other desirable elastomeric materials include those HSN materials disclosed in U.S. Pat. No. 5,323,863, that is incorporated herein by reference, and a proprietary HSN manufactured by Smith International, Inc., under the product name HSN-8A. It is to be understood that the HNBR material set forth in the example, and the HSN materials described above, are simply examples of elastomeric materials useful for making O-ring seals according to this invention, and that other elastomeric materials made from different chemical compounds and/or different amounts of such chemical compounds may also be used.

It is desired that such elastomeric materials have a modulus of elasticity at 100 percent elongation of from about 400 to 2,000 psi (3 to 12 megapascals), a minimum tensile strength of from about 1,000 to 7,000 psi (6 to 42 megapascals), elongation of from 100 to 500 percent, die C tear strength of at least 100 lb/in. (1.8 kilogram/millimeter), durometer hardness Shore A in the range of from about 60 to 95, and a compression set after 70 hours at 100° C. of less than about 18 percent, and preferably less than about 16 percent.

An exemplary elastomeric composition may comprise per 100 parts by weight of elastomer (e.g., HSN, HNBR and the like), carbon black in the range of from 20 to 50 parts by weight, peroxide curing agent in the range of from 3 to 10 parts by weight, zinc oxide or magnesium oxide in the range of from 4 to 7 parts by weight, stearic acid in the range of from 0.5 to 2 parts by weight, and plasticizer up to about 10 parts by weight. From 1 to 10 parts by weight of wax may also be included.

O-ring seals constructed according to principles of this invention include a lubricant additive distributed uniformly throughout at least the portion of the elastomeric material that may come in dyanamic contact with metal surfaces in the rock bit during its useful life. Preferably, for ease of manufacture, the lubricant additive is distributed throughout the entire cross section of the O-ring seal. The lubricant additive of the present invention is polarized graphite.

Unlike graphite, polarized graphite is a unique material that exhibits extremely good load carrying ability and anti-wear performance. Graphite consists of carbon in a layered structure, and the lack of polarity prevents graphite powder from forming a lubricant film and adhering to metal surfaces. The polarization of graphite results in the material having good adhesion to metal and forming a lubricant film that can carry extremely high loads without failure. Accordingly, the present O-ring seal having polarized graphite serves as a self-lubricating elastomeric seal.

Ordinary graphite has a laminar hexagonal crystal structure and the closed rings of carbon atoms do not normally have any electrical polarization. Hence, graphite has good lubricity in that the layers may slip or shear readily. However, the lack of polarity leads to poor adhesion to metal surfaces. Graphite can be treated with alkali molybdates and/or tungstenates, alkali earth sulfates and/or phosphates and mixtures thereof to impart a polarized layer at the surface of the graphite. Alternating positive and negative charges are apparently formed on the surfaces. The treated graphite shows extremely good load carrying capacity and anti-wear performance, somewhat similar to molybdenum disulfide. The polarized graphite has good adhesion of particles on metal surfaces and good film forming ability. Polarized graphite is available from Dow Corning Corporation, Midland, Mich., under the trademark Lubolid. Several grades of polarized graphite are available and it has been found that Lubolid 7365 and Lubolid D-79 are satisfactory. Compression set of the O-ring is not degraded by the polarized graphite. The Lubilid D-79 grade of polarized graphite has about 2% of material that is extractable in boiling water. Additional information on polarized graphite can be found in U.S. Pat. No. 5,445,748. As stated therein, various coefficients of friction can be obtained in polarized graphite. It is found that for use in elastomeric seals, a low coefficient of friction is desirable.

The particle size of the polarized graphite is in the range of from about two to ten micrometers. For mixing with the elastomer, the polarized graphite was screened to minimize the size of agglomerations of the graphite before mixing. The polarized graphite used was all passed through a 100 mesh (about 150 micrometers) screen. It may be desirable to pass all the polarized graphite through a 325 mesh (about 45 micrometers) screen.

The present self-lubricating elastomeric seal is prepared by mixing the polarized graphite directly into the elastomeric compound in a conventional rubber mill. As the elastomeric seal experiences wear against the adjacent metal surfaces (i.e. the leg and cone), the polarized graphite flakes are released into the interface between the elastomeric seal and adjacent metal surface. The released flakes of polarized graphite form a continuous film across the metal surface which allows the elastomeric seal to ride on the polarized graphite film, thereby reducing the amount of friction between the elastomeric seal and metal surfaces. The adhesion properties of polarized graphite allow it to adhere to the metal surfaces adjacent the elastomeric seal and create the film which serves as a physical separation between opposing metal surfaces.

Because wear of the seal causes the polarized graphite release and formation of the lubricating film, the elastomeric seal is self-lubricating. Therefore, the polarized graphite, unlike graphite alone, acts as an adhesion promoter and changes the lubricity of the graphite entirely, allowing the polarized graphite to support much heavier loads, protect metal surfaces, and improve anti-wear performance. The initial release of polarized graphite reduces subsequent wear of the O-ring seals and prolongs useful life.

Stick-slip refers to a mechanism of failure in rock bit O-ring seals. As the elastomer of the O-ring seal moves along the metal surface of the leg or cone, the O-ring seal material momentarily sticks to the metal surface. Almost instantly the elastomer then slips relative to the metal. This making and breaking of bonds between the elastomer and metal dissipates energy and causes frictional heating. Furthermore, if too strong a bond is formed between the elastomer and metal, some of the elastomer may be removed from the O-ring, thereby degrading the O-ring surface and roughening the rock bit surface. The lubricant additive described above has been selected because of its ability to minimize the amount of sticking between the elastomer and metal without changing the bulk properties of the main body of the O-ring.

O-ring seal compositions of this invention comprise in the range of from about 50 to 99 percent by volume elastomeric material, and in the range about 1 to 50 percent by volume of the polarized graphite lubricant additive based on the total volume of the seal composition. A seal composition comprising less than about one percent by volume of the lubricant additive at least at the dynamic seal surface contains an insufficient amount of the lubricant additive to provide a desired reduction in the friction, wear, abrasion, and stick-slip characteristics of the elastomeric material. A seal composition comprising greater than about 50 percent by volume of the lubricant additive contains an amount of lubricant additive that could interfere with or adversely affect desired mechanical properties of the elastomeric material, particularly compression set and abrasion resistance, which are important properties in seals for the bearings of rock bits.

It is also found desirable to include a wax in the composition of the O-ring. The wax melts at the molding and curing temperature of the elastomer and serves as a mold release agent for easing ejection of the semi-cured O-ring from the mold. More significantly, the wax melts and aids lubrication at the surface of the O-ring during service in the rock bit. Some of the wax may be lost from the surface during such service and wax can migrate from the interior to the surface as replacement for any wax lost. The wax is mixed into the composition along with other additives in a rubber mill. Mixing may be at a temperature above the melting point of the wax for uniform distribution.

Suitable waxes include, for example, oleamide, erucamide, blends of these and soy oil derivatives. Commercially available waxes are Armoslip CP, Armoslip CPM and Armoslip EXP available from Akzo Chemicals, Chicago, Ill. and Chemamide E, Chemamide S, a stearamide soy oil derivative, and Chemamide V available from Crompton Witco, Petrolia Pa. Preferably the melting temperature of the wax is less than usual operating temperataure of the rock bit. The melting temperature of oleamide is about 72° C., erucamide is about 75 to 80° C., Armoslip CP is about 72° C., Chemamide E is about 76 to 86° C., Chemamide S is about 98 to 108° C. and Chemimide U is about 68 to 78° C.

The maximum amount of wax used is somewhat dependent on the curing system for the elastomer. For peroxide curing systems, up to about 10 parts of wax per hundred parts of elastomer may be used without unduly interfering with the curing. With sulfur curing systems, up to about 20 parts of wax per hundred parts of elastome may be used. At least about one part wax per hundred parts elastomer is desirable to obtain any effect. From about three to six parts of wax per hundred parts of elastomer is preferred.

It is preferred that the composition of elastomer at least on the dynamic seal surface comprises from about 7 to 25 by volume of polarized graphite and a balance of elastomeric composition (i.e. including elastomer, carbon black, plasticizers, oxidation inhibitors, etc.). When the composition contains less than about 7 percent polarized graphite the desirable phenomena of reduced stick-slip, seal wear and leg wear are diminished. When the composition contains more than about 25 percent polarized graphite, seal wear resistance is reduced and compression set may increase.

When higher concentrations of polarized graphite are used, wear resistance of the seal may be enhanced by changing at least a part of the carbon black in the elastomer to a more erosion resistant grade, e.g., a grade commonly used for tire treads. Thus, for example a composition with as much as 25% to 30% polarized graphite may also include about 20% of erosion resistant carbon black in a balance of about 45% to 60% elastomer and other non-carbon ingredients.

A particularly preferred composition comprises about 15 percent by volume polarized graphite and 85 percent by volume elastomeric composition. A standard test of seals compared a prior composition of elastomer O-ring with the same composition with 15 percent added polarized graphite. The test rotates a simulated steel rock bit leg and seal at 300 rpm for 96 hours. The average temperature of the steel "leg" with the prior composition was about 292° F., whereas the steel leg average temperature was only about 256° to 260° F. when run with the seal with 15 percent polarized graphite. The average rotational torque was about 161 inch-pounds with the prior seal and about 143 to 150 inch-pounds with the seal with polarized graphite. Seal wear loss decreased from about 6.84% to about 4.96% to 5.39% for the new seal. Similarly, leg wear decreased from about 0.005 inch to about 0.003 inch.

A wear phenomenon that sometimes occurs in rock bit seals is pitting (often called nibbling) of the seal surface. This seems to be eliminated in seals including polarized graphite. The seals are slick and smooth after running in standard tests. Furthermore, the steel surfaces are smooth and free of pitting.

Seal compositions of this invention are prepared by combining the elastomeric seal component with the polarized graphite lubricant additive by conventional solid mixing techniques, such as by rubber mill processing and the like, until the polarized graphite is uniformly distributed throughout the elastomeric material. The polarized graphite may be mixed into the elastomer at the same time as carbon black and other ingredients, or may be added in a separate mixing after the basic composition is milled. The O-ring seal is formed and cured according to conventional industry practices for forming and curing O-rings seals made from conventional elastomeric materials, e.g., by a high temperature mold process. An additional feature of O-ring seals formed from elastomeric seal compositions of this invention is that the presence of the polarized graphite aids the release of the just formed O-ring seal from the mold during the high-temperature molding process.

Another advantage arises from utilizing polarized graphite. The polarization appears to promote cross linking of the polymers and improved bonding of the elastomer composition.

Referring to FIG. 3, an exemplary embodiment of an O-ring seal 48 of this invention comprises a body 50 having a symmetric axial cross section, the body being formed from the elastomeric material 52 and the polarized graphite 54 uniformly distributed throughout. Referring to FIG. 4, an alternative embodiment of an O-ring seal 55 of this invention comprises a body 56 having an asymmetric axial cross section, the body being formed from the elastomeric material 58 and the polarized graphite 60 uniformly distributed throughout.

If desired, either of these, or other cross sectional configurations, may be formed with a surface layer containing polarized graphite uniformly distributed throughout, and a core away from the surface having a different quantity or even no polarized graphite. Such a surface layer containing polarized graphite may be sufficient on the dynamic surface of the O-ring seal, with the balance of the seal body formed of a different composition. Such a seal with layers of elastomer with different composition is made by coextruding the mixed elastomers to form a "blank" to fit in a mold. In a rock bit O-ring having a layer of elastomer containing polarized graphite on the dynamic seal surface, the layer is typically about 0.025 to 0.030 inch thick for a round ring having a total cross sectional diameter of 0.25 inch. Such a layer may be solely on the dynamic seal surface or may be around the entire cross section of the O-ring. The "core" is formed of an elastomer with excellent compression set, heat resistance and other properties important for a rock bit O-ring.

An elastomer with polarized graphite may also be used in composite seals which include a fabric or other fibrous material for strength. An elastomer with polarized graphite may also be advantageously used in a rock bit seal which has a metal ring at least partly faced with elastomer on the dynamic seal surface. For purposes of this disclosure and claims, an "O-ring" seal is considered broadly to include symmetrical or asymmetrical configurations as well as metal or fabric composite seals including elastomers.

The completed O-ring seal is placed into position in the rock bit with portions of the seal surface in contact with respective surfaces of the cone and the journal. In an exemplary rotary cone rock bit, the O-ring seal is mounted within the cone and includes a static seal surface that is in contact with the cone, and a dynamic seal surface that is placed adjacent a journal pin. As the cone is rotated about the journal pin, the dynamic seal surface slides over the adjacent journal pin surface, producing friction at the dynamic seal surface. The presence of the polarized graphite in the elastomeric seal composition reduces the amount of friction produced at the dynamic seal surface, and reduces the amount of stick-slip by minimizing the occurrence of the "sticking" portion and maximizing the "slipping" portion of the stick-slip phenomenon. The reduction of stick-slip serves to reduce material loss from the surface of the O-ring seal and, thus extends the service life of the O-ring seal and rock bit.

Polarized graphite may be advantageously incorporated into seal compositions in addition to the nitrile and nitrile-butadiene compositions particularly preferred for rock bits. Other elastomeric base polymers include, for example, epichlorhydrins, acrylics, silicones, EPDM, natural rubber, PEEK, styrene-butadiene rubber and various chlorinated and fluorinated elastomer compositions. These are merely exemplary and not intended as an exclusive listing of suitable elastomers. The polarized graphite is mixed with the seal compositions in the same way that other solid powders (such as pigments or other adjuvants) are mixed with the polymers.

O-ring seals made from elastomeric compositions of this invention have a reduced coefficient of friction, display reduced wear, stick-slip, and abrasion, when compared to O-ring seals formed from conventional elastomeric materials not having polarized graphite. Moreover, the present seals are self-lubricating because as the seal experiences wear against adjacent metal surfaces, the polarized graphite releases flakes onto an interface between the seal and the adjacent metal surfaces. The seal then rides on the polarized graphite film, reducing wear and friction.

Because polarized graphite exhibits good adhesion to metal and forms the lubricating film, the seal is able to carry high loads without failure.

Although, limited embodiments of O-ring seal compositions for rock bit bearings have been described and illustrated herein, many modifications and variations will be apparent to those skilled in the art. Accordingly, it is to be understood that within the scope of the appended claims, O-ring seals for rock bit bearings according to principles of this invention may be embodied other than as specifically described herein.

What is claimed is:

1. A journal seal for use in a rotary cone rock bit comprising:
   a flexible and resilient seal body formed from an elastomeric material selected from materials consisting of highly-saturated nitrile elastomers, nitrile-butadiene rubber, highly-saturated nitrile-butadiene rubber, and mixtures thereof; and
   a seal dynamic surface along cone surface area of the seal body, and a seal static surface along another surface area of the seal body, each formed from an elastomeric material, wherein the elastomeric material further comprises polarized graphite at least at the seal dynamic surface.

2. The seal as recited in claim 1 wherein the dynamic seal surface has sufficient polarized graphite to release flakes of polarized graphite when an adjacent metal surface wears against the seal body, such that the flakes of polarized graphite adhere to the adjacent metal surface and form a lubricating film.

3. The seal as recited in claim 1 comprising in the range of from 1 to 50 percent by volume of polarized graphite based on the total volume of the combined elastomeric material and polarized graphite.

4. The seal as recited in claim 1 comprising in the range of from 7 to 25 percent by volume of polarized graphite based on the total volume of the combined elastomeric material and polarized graphite.

5. The seal as recited in claim 1 comprising about 15 percent by volume of polarized graphite based on the total volume of the combined elastomeric material and polarized graphite.

6. The seal as recited in claim 1 wherein the polarized graphite is distributed uniformly throughout the elastomeric material forming the seal body, and dynamic and static sealing surfaces.

7. A rotary cone rock bit for drilling subterranean formations comprising;
   a bit body including a plurality of journal pins each extending from a leg portion of the bit and having a bearing surface;
   a cutter cone rotatably mounted on each journal pin and including a bearing surface;
   a grease adjacent the bearing surfaces; and
   a dynamic annular seal for retaining the grease between the bearing surfaces comprising:
      a body portion and a surface portion both being flexible and resilient, and each being formed from an elastomeric composition selected from materials consisting of highly-saturated nitrile elastomers, nitrile-butadiene rubber, highly-saturated nitrile-butadiene rubber, and mixtures thereof, wherein the elastomeric composition at least adjacent a surface portion additionally comprises polarized graphite.

8. The rock bit as recited in claim 7 wherein the elastomer contains a sufficient amount of polarized graphite so that friction between the surface portion of the annular seal and an adjacent metal surface causes the surface portion to release flakes of polarized graphite that adhere to the adjacent metal surface and form a lubricating film.

9. The rock bit of claim 8 wherein the adjacent metal surface is at least one of the journal pin and the cone.

10. The rock bit as recited in claim 7 wherein at least a dynamic seal surface portion of the annular seal comprises in the range of from 1 to 50 percent by volume polarized graphite based on the total volume of the elastomeric composition and polarized graphite.

11. The rock bit as recited in claim 7 wherein at least a dynamic seal surface portion of the annular seal comprises in the range of from 7 to 25 percent by volume polarized graphite based on the total volume of the elastomeric composition and polarized graphite.

12. The rock bit as recited in claim 7 wherein at least a dynamic seal surface portion of the annular seal comprises about 15 percent by volume polarized graphite based on the total volume of the elastomeric composition and polarized graphite.

13. The rock bit as recited in claim 7 wherein the polarized graphite is distributed uniformly throughout the elastomeric composition.

14. The rock bit as recited in claim 7 wherein polarized graphite is distributed uniformly throughout the elastomeric composition in the range of from 1 to 50 percent by volume.

15. The rock bit as recited in claim 7 wherein the seal composition also includes a wax.

16. The rock bit as recited in claim 15 wherein the wax is present in the range of from about one to ten parts per hundred parts of elastomer.

17. A rotary cone rock bit for drilling subterranean formations comprising:

a bit body including a plurality of journal pins each extending from a leg portion of the bit and having a bearing surface;

a cutter cone rotatably mounted on each journal pin and including a bearing surface;

a pressure-compensated grease reservoir in communication with such bearing surfaces;

a grease in the grease reservoir and adjacent the bearing surfaces; and a dynamic O-ring seal for retaining the grease between the bearing surfaces comprising:

a resilient and flexible elastomeric body having a static sealing surface along a first body portion and a dynamic sealing surface along a second body portion, the elastomeric composition further comprising polarized graphite uniformly distributed in at least the dynamic sealing surface.

18. The rock bit as recited in claim 17 wherein the polarized graphite is distributed uniformly throughout the elastomeric composition.

19. The rock bit of claim 18 wherein the elastomeric composition comprises in the range of from 1 to 50 percent by volume polarized graphite based on the total volume of the composition.

20. The rock bit of claim 17 wherein the elastomeric composition comprises in the range of from 1 to 50 percent by volume polarized graphite based on the total volume of the composition.

21. The rock bit as recited in claim 17 wherein at least a dynamic seal surface portion of the annular seal comprises in the range of from 7 to 25 percent by volume polarized graphite based on the total volume of the elastomeric composition and polarized graphite.

22. The rock bit as recited in claim 17 wherein at least a dynamic seal surface portion of the annular seal comprises about 15 percent by volume polarized graphite based on the total volume of the elastomeric composition and polarized graphite.

23. The rock bit as recited in claim 17 wherein the seal composition also includes a wax.

24. The rock bit as recited in claim 23 wherein the wax is present in the range of from about one to ten parts per hundred parts of elastomer.

25. The rock bit as recited in claim 17 wherein the polarized graphite is distributed uniformly throughout the elastomeric composition.

26. The rock bit as recited in claim 17 wherein the elastomeric composition contains sufficient polarized graphite to release flakes of polarized graphite when the bearing surfaces wear against the O-ring seal, wherein the flakes of polarized graphite adhere to the bearing surfaces and form a lubricating film.

\* \* \* \* \*